No. 11,898. Reissued Mar. 26, 1901.

J. L. LAMB.

COAL LOADING APPARATUS.

(Application filed Jan. 28, 1901.)

3 Sheets—Sheet 1.

Witnesses:
Albert D. Bacci.
D. N. Lee

Inventor:
J. L. Lamb,
By Thomas F. Sheridan,
Atty.

No. 11,898. Reissued Mar. 26, 1901.

J. L. LAMB.

COAL LOADING APPARATUS.

(Application filed Jan. 28, 1901.)

3 Sheets—Sheet 2.

Witnesses:
Albert D. Bacci.
D. N. Lee.

Inventor:
J. L. Lamb,
By Thomas F. Sheridan,
Att'y.

No. 11,898. Reissued Mar. 26, 1901.
J. L. LAMB.
COAL LOADING APPARATUS.
(Application filed Jan. 28, 1901.)
3 Sheets—Sheet 3.
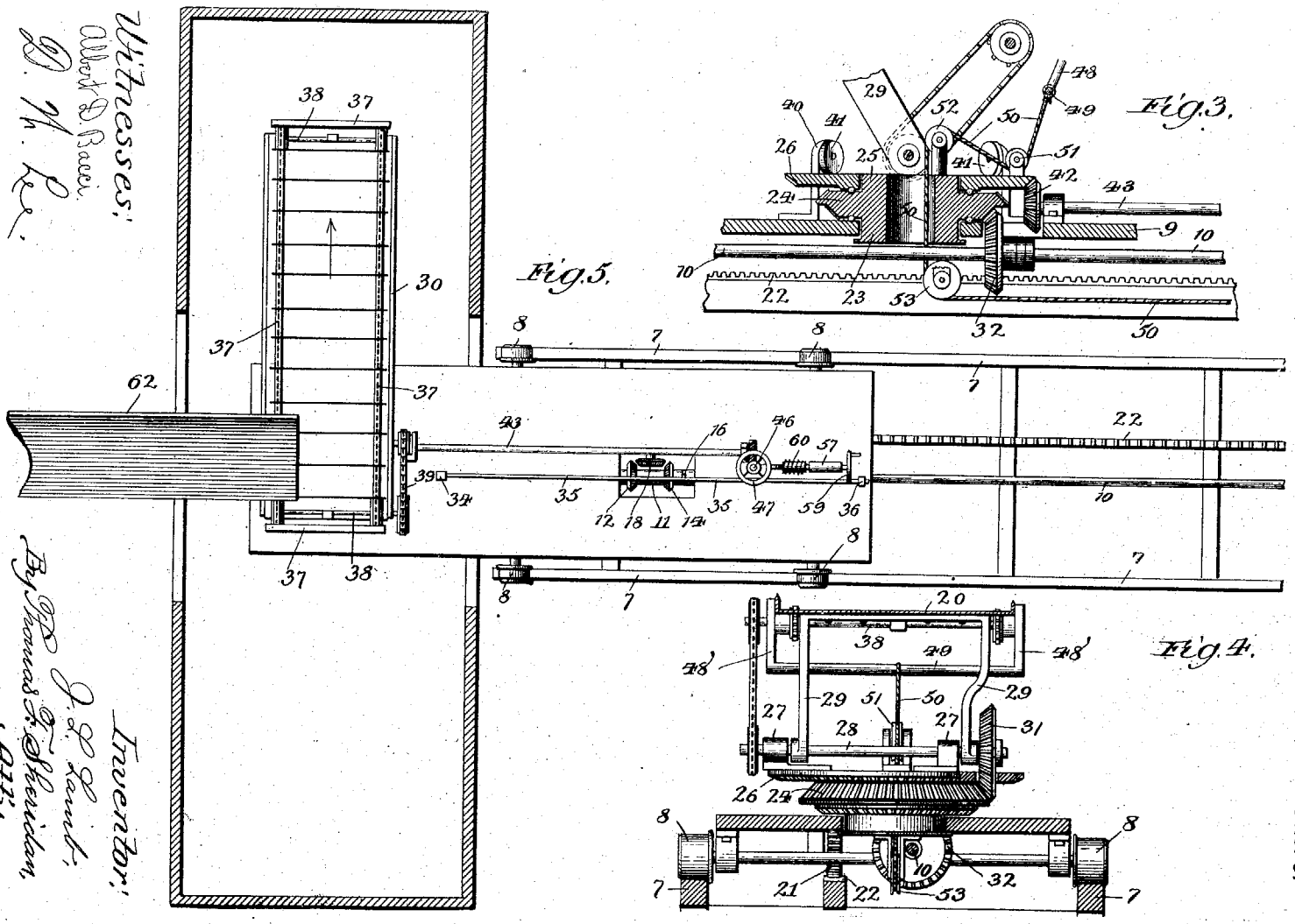
Witnesses:
Albert D. Bacci.
D. H. Lee.
Inventor:
J. L. Lamb,
By Thomas F. Sheridan,
Atty.

UNITED STATES PATENT OFFICE.

JAMES L. LAMB, OF TRINIDAD, COLORADO, ASSIGNOR TO THE VICTOR BOX-CAR LOADER COMPANY, OF COLORADO.

COAL-LOADING APPARATUS.

SPECIFICATION forming part of Reissued Letters Patent No. 11,898, dated March 26, 1901.

Original No. 619,191, dated February 7, 1899. Application for reissue filed January 28, 1901. Serial No. 45,185.

*To all whom it may concern:*

Be it known that I, JAMES L. LAMB, of Trinidad, in the county of Las Animas and State of Colorado, have invented a new and Improved Coal-Loading Apparatus, of which the following is a full, clear, and exact description.

This invention relates to an apparatus for loading coal into cars, and particularly for loading coal into box-cars, the invention embodying a trestle-way or support on which a carriage is mounted to slide toward and from the car, the carriage supporting a conveyer mounted to turn and to be moved vertically, so that it may be adjusted to properly direct the coal.

This specification is the disclosure of one form of my invention, while the claims define the actual scope of the invention.

Figure 1:
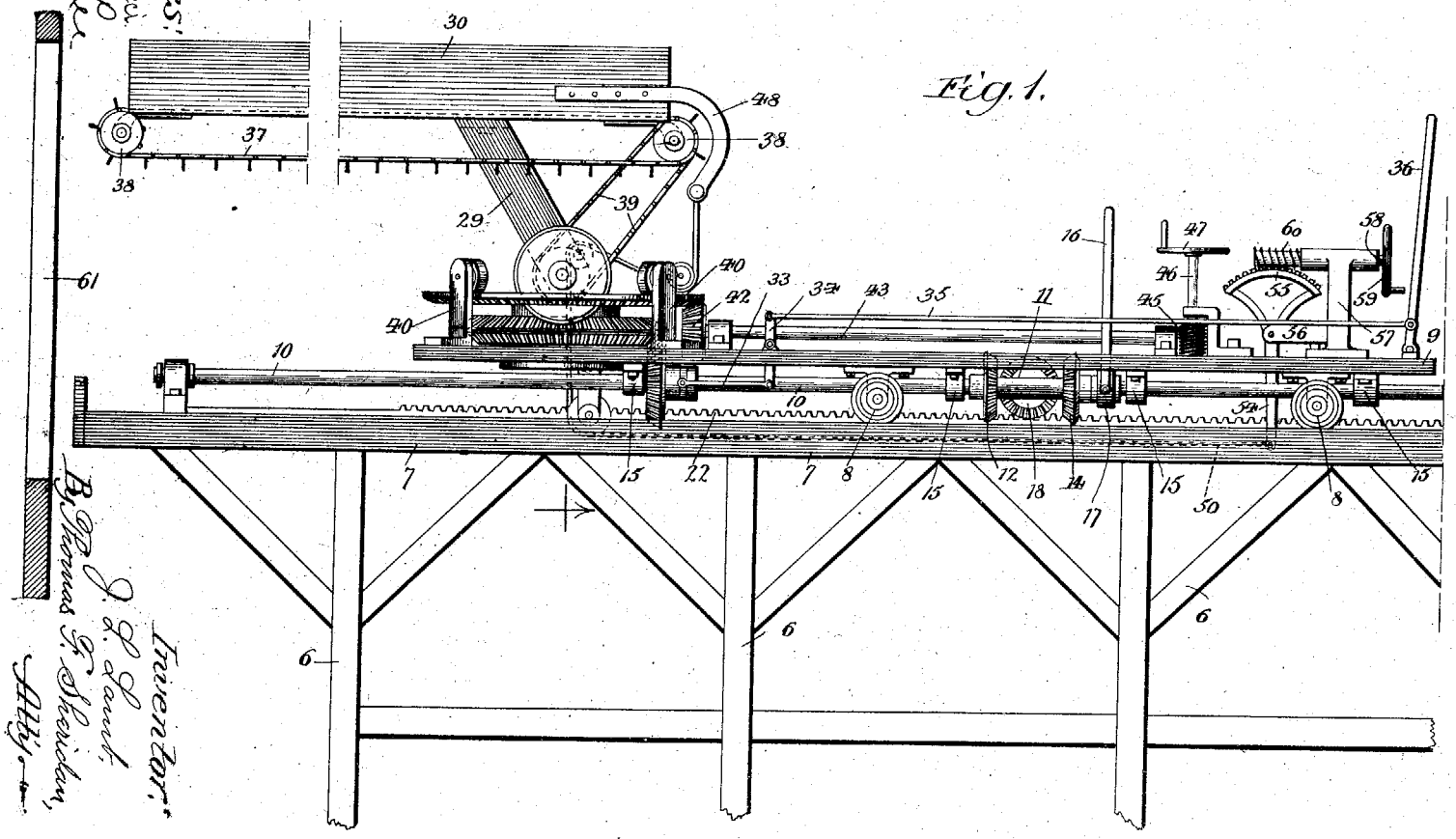
Figure 2:
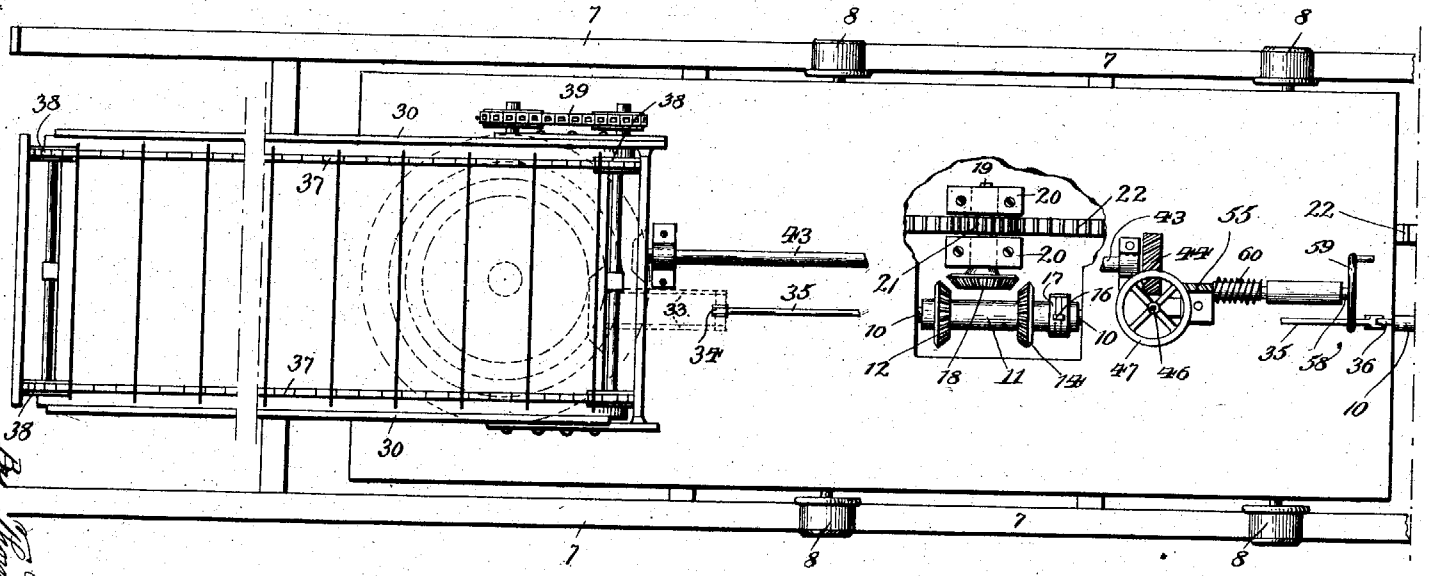

Figure 1 is a side elevation of the invention. Fig. 2 is a plan view thereof with parts broken away. Fig. 3 is a section taken vertically through the carrier-platform and longitudinally with the carriage. Fig. 4 is a section of the same parts on a line transverse to the carrier; and Fig. 5 is a plan view of the invention, showing it in connection with the car.

The trestle-work 6 has two horizontal rails 7, on which run the wheels 8 of the carriage 9, and mounted on the trestle and extending longitudinally with the same is a shaft 10, driven continuously by a suitable source of power. (Not shown.) Splined on the shaft 10 is a sleeve 11, at one end of which is a bevel-gear 12, and at the other end of which is a bevel-gear 14. The carriage 9 is provided with bearings 15, in which the shaft 10 is slidably held, such bearings moving with the carriage. The sleeve 11 is located between two of the bearings 15 and is adapted to slide with the carriage and to turn continuously with the shaft 10. A lever 16 is mounted on the carriage and connected by a collar 17 with the sleeve 11, so that upon swinging the lever the sleeve, with its gears 12 and 14, may be moved to cause either of the gears to engage with a bevel-gear 18, mounted on the shaft 19, held in bearings 20, fixed to the carriage 9. By moving the sleeve 11 to an intermediate position the gears 12 and 14 may be placed so that neither of the said gears will be in engagement with the gear 18. Fixed to the shaft 19 is a spur-gear 21, which turns with the shaft 19 and moves with the carriage 9, and which engages a rack 22, fixed to the trestle-way 6. By these means the revolution of the shaft 10 may, when the gears 12 and 14 are properly adjusted, be caused to revolve the shaft 19, and consequently drive the carriage 9 along the trestle-way through the medium of the spur-gear 21 and the rack 22.

Mounted on the outer end of the carriage 9 by means of a flanged hub 23, arranged to turn in the carriage, is a double-faced bevel-gear 24, from the upper face of which projects a hub 25, on which a bevel-gear 26 is revolubly mounted, and fixed to the top of the bevel-gear 26 are two bearings 27, in which is mounted a revoluble shaft 28, which carries loosely the arms 29 of the conveyer-frame 30, by which means the conveyer-frame is supported. The shaft 28 has a bevel-gear 31 fixed thereto, which meshes with the upper part of the bevel-gear 24, the gear 31 extending through an opening in the gear 26, as shown best in Fig. 4. The lower part of the gear 24 meshes with a bevel-gear 32, splined on the shaft 10 and connected by a link 33 with a lever 34, which is fulcrumed on the carriage 9. The lever 34 in turn is connected with a link 35, which runs rearwardly, and is connected to a lever 36, mounted on the carriage 9. By these means the gear 32 may be moved in and out of engagement with the lower part of the gear 24, and thus the revolution of the shaft 28 may be regulated. The conveyer-frame 30 carries an endless conveyer 37, passing around conveyer-rolls 38, held by the frame 30. The inner roll 38 is provided with a sprocket-wheel over which passes a chain 39, the chain also passing downwardly over a sprocket-wheel on the end of the shaft 28 opposite the end having the gear 31. By these means the conveyer may be driven, such movement being controlled by the hand-lever 36. Brackets 40 are attached to the carriage 9 and carry at their upper ends anti-friction-rollers 41, which bear down on the upper surface of the gear 26 to prevent the displacement thereof, but at the same time permit the gear 28 to revolve.

The gear 26 is driven, so as to swing the carrier or conveyer, by means of a bevel-gear 42, meshing with the gear 26 and carried on a revoluble shaft 43, mounted on the carriage 9 and running rearwardly thereon. The shaft 43 is provided with a worm-wheel 44 at its rear end, which meshes with a worm 45, fast to a perpendicular spindle 46, mounted on the carriage 9 and having a hand-wheel 47 at its upper end.

For adjusting the inclination of the carrier or conveyer-frame I attach two arms 48 to the sides of the conveyer-frame, such arms being connected with each other by a transverse bar 49. Connected with the bar 49 is a cord 50, which passes down around a pulley 51, mounted on the top of the gear 26, and which next passes approximately horizontally around a pulley 52, carried by the hub 25 of the wheel 24. From the pulley 52 the cord 50 passes downwardly through the hollow middle portion of the hubs 25 and 23 and around a pulley 53, carried by a bracket attached to the hub 23 and projecting downwardly therefrom. From the pulley 53 the cord 50 runs rearwardly and is attached to the arm 54 of a toothed sector 55, pivoted on the arm 56 of a bracket 57, in turn carried by the carriage 9. The bracket 57 has a bearing in its top, in which bearing is mounted a spindle 58, carrying at one end a hand-wheel 59 and at the other end a worm 60, meshing with the sector 55. By means of these devices the cord 50 may be drawn in or slacked off, thus raising or lowering the carrier-frame, the same being connected to the arms 29 on the shaft 28, before described.

In using the invention the carriage 9 is projected along the trestle-way 6 until the outer end of the carriage extends into the car 61. (For which see Fig. 5.) Meanwhile the shaft 43 should have been operated to turn the gear 26, and thus adjust the carrier, so that it will deliver the coal into one end of the car. The coal is fed to the carrier 30 in the direction opposite that in which the carriage 9 is located, such feeding being done by means of a chute 62. This arrangement permits of filling one end of the car with coal, whereupon the carriage 9 may be withdrawn and the chute 62 permitted to discharge the coal into the middle of the car. Meanwhile the carriage 9 may be moved back and the carrier 30 shifted so as to project into the opposite end of the car, and upon receiving the coal from the chute 62 the coal will fill said opposite end.

All of the elements of the apparatus are directly under the control of the operator, and by means of the apparatus it is possible to quickly and conveniently coal box-cars and other rolling stock.

Having thus described my invention, I claim as new and desire to secure by Letters Patent—

1. In a loader for box-cars, the combination of a trestle, a rack mounted thereon, a carriage mounted to roll on the trestle, a shaft mounted on the carriage, a gear-wheel attached to the shaft and meshing with the rack, a second gear-wheel attached to the shaft, a revoluble shaft mounted on the trestle, a sleeve splined on the revoluble shaft and adapted to slide with the carriage, the sleeve being revolved by the said shaft, a gear-wheel attached to each end of the sleeve, the gear-wheels being capable of meshing with the second-named gear-wheel of the first-named shaft, and means for adjusting the sleeve with relation to the gear-wheels, substantially as described.

2. In a loader for box-cars, the combination of a carriage, a double-faced bevel-gear mounted on the carriage, a second gear mounted on the bevel-gear, a carrier supported on the second-named gear, a shaft mounted on said second-named gear, a spur-wheel attached to the said shaft and meshed with the upper part of the first-named gear, means connecting the shaft with the carrier, and a gear engaging the lower part of the first-named gear to turn the same, substantially as described.

3. In a loader for box-cars, the combination of a carriage, a two-part gear mounted to turn thereon, a second gear mounted to turn on the first-named gear, a carrier supported on the second gear, means for independently driving the two gears, a shaft mounted on the second-named gear and connected with the carrier, and a gear attached to the said shaft and meshing with the upper part of the two-part gear, substantially as described.

4. In a loader for box-cars, the combination of a support, a rack running along the same, a revoluble shaft mounted in parallelism with the rack, a sleeve splined on the shaft, a carriage rolling on the support and attached to the sleeve, to move therewith, oppositely-beveled gears carried, respectively, at the ends of the sleeve, a shaft mounted on the carriage, a gear attached to the shaft and capable of being engaged by either one of the gears of the sleeve, a second gear attached to the shaft of the carriage and meshing with the rack, and means for sliding the sleeve independently of the carriage, to engage and disengage the several gears of the sleeve, substantially as described.

5. In a loader for box-cars, the combination of a carriage, a gear-wheel mounted thereon and having two sets of teeth, gearing meshing with one of said sets of teeth to drive the gear-wheel, a second gear-wheel mounted to turn on the first gear-wheel, a shaft revolubly carried on the said second gear-wheel, a gear attached to the shaft and meshing with the other set of teeth of the first-named gear-wheel, the gear of the said shaft being extended through an opening in the second gear-wheel, and means in connection with the second gear-wheel for turning the same independently of the first gear-wheel, substantially as described.

6. In a loader for box-cars, the combination of a revolubly-mounted gear-wheel, a second gear-wheel mounted to turn on the first gear-wheel, a shaft mechanism mounted on the second gear-wheel and having connection with the first gear-wheel, to be driven therefrom, and means in connection with the second gear-wheel by which to turn the same and the parts carried thereby independently of the first gear-wheel, substantially as described.

7. In a loader for box-cars, the combination of two gears mounted to turn, the one on the other, mechanism mounted on one of said gears, such gear forming a support for the mechanism, means for driving said mechanism from the other gear, and means in connection with the first-named gear for turning the same independently of the second or driving gear, substantially as described.

8. In a loader for box-cars, the combination of a movable carriage arranged to be moved forwardly and backwardly into and out of a car, an endless conveyer pivotally mounted on the carriage at or near the outer end thereof in substantially a horizontal plane to receive coal and discharge it to the desired points of a box-car, and means for swinging the conveyer in a horizontal plane, substantially as described.

9. In a loader for box-cars, the combination of a supporting-carriage arranged to be moved forwardly and backwardly into and out of a car, an endless flexible conveyer pivotally mounted on the carriage at or near the front end and arranged in substantially a horizontal plane to receive and discharge coal into the car, means for swinging the conveyer in a horizontal plane, and means for swinging the conveyer in a vertical plane, substantially as described.

10. In a loader for box-cars, the combination of a supporting-carriage arranged to be moved forwardly and backwardly into and out of the car, an endless flexible conveyer pivotally mounted thereon at or near the outer end thereof arranged substantially in a horizontal plane to receive and discharge coal in the car, bevel-gear mechanism for swinging the conveyer in a horizontal plane, a horizontally-arranged shaft provided with a bevel-gear to operate the first-named bevel-gear, means for swinging the conveyer in a vertical plane, and gear mechanism for operating the conveyer, substantially as described.

11. In a loader for box-cars, the combination of a supporting-carriage arranged to be moved forwardly and backwardly into and out of a car, a horizontal main shaft arranged longitudinally therewith, gear mechanism in operative engagement with such main shaft to move the carriage forwardly and backwardly, a two-faced gear operatively engaging the main shaft, a conveyer-frame pivotally secured to the carriage in alinement with the axis of the two-faced gear and arranged to be swung in horizontal and vertical planes, an endless flexible conveyer mounted on the conveyer-frame, means for swinging the conveyer in a horizontal plane, and means for swinging the conveyer in a vertical plane, substantially as described.

12. In a loader for box-cars, the combination of a supporting-carriage arranged to be moved forwardly and backwardly into and out of the car, a continuously-rotatable main shaft arranged horizontally and longitudinally of the supporting-carriage, gear mechanism in operative engagement with such shaft to move the carriage forwardly and backwardly, a two-faced bevel-gear operatively engaged with the main shaft at or near the outer end of the supporting-carriage, a conveyer-frame adapted to be swung in horizontal and vertical planes and with its vertical axis in alinement with the axis of the two-faced bevel-gear, an endless flexible conveyer mounted in the conveyer-frame, gear mechanism for swinging the conveyer-frame in a horizontal plane, and means for swinging the conveyer in a vertical plane, substantially as described.

13. In a loader for box-cars, the combination of a supporting movable carriage, a main shaft arranged horizontally and longitudinally therewith, gear mechanism in operative engagement with such main shaft to move the carriage forwardly and backwardly into and out of the car, a two-faced gear operatively engaging the main shaft at or near the outer end of the carriage, a second bevel-gear arranged above and with its axis in alinement with the two-faced gear, a conveyer-frame pivotally secured to such bevel-gear to swing with it in a horizontal plane and have independent movement thereon in vertical planes, an endless flexible conveyer mounted on the conveyer-frame, gear-and-sprocket mechanism connecting it with the two-faced gear to operate the same, and gear mechanism to operate the gear which supports the conveyer-frame and swing it with the conveyer-frame in horizontal planes, substantially as described.

14. In a loader for box-cars, the combination of a supporting movable carriage, a main shaft arranged horizontally and longitudinally therewith, gear mechanism in operative engagement with such main shaft to move the carriage forwardly and backwardly into and out of the car, a two-faced bevel-gear operatively engaging the main shaft at or near the outer end of the carriage, a second bevel-gear arranged above and with its axis in alinement with the two-faced bevel-gear, a conveyer-frame pivotally secured to such bevel-gear to swing with it in a horizontal plane and have an independent movement thereon in vertical planes, an endless flexible conveyer mounted on the conveyer-frame, gear-and-sprocket mechanism connecting it with the two-faced bevel-gear to operate the same, gear mechanism to operate the gear which supports the conveyer-frame and swing it with the conveyer-frame in horizontal planes, and a second shaft 43 arranged horizontally and longitudinally of the carriage and connected with the last-named bevel-gear mechanism to operate it and thereby swing the conveyer-frame in a horizontal plane, substantially as described.

JAMES L. LAMB.

Witnesses:

CHARLES H. KNICKERBECKE,
ZOE STONE.